United States Patent [19]

Chou et al.

[11] Patent Number: 5,249,002
[45] Date of Patent: Sep. 28, 1993

[54] TELEDIOPTRIC SYSTEM

[75] Inventors: Jim-Son J. Chou, Irvine; Charles A. Cummings, Newport Beach, both of Calif.

[73] Assignee: Allergan, Inc., Irvine, Calif.

[21] Appl. No.: 788,478

[22] Filed: Nov. 6, 1991

[51] Int. Cl.[5] ............... G02C 7/08; G02C 1/00; A61F 2/16
[52] U.S. Cl. ................... 351/158; 351/41; 623/6
[58] Field of Search ............ 351/158, 231, 41; 623/6

[56] References Cited

U.S. PATENT DOCUMENTS

| | | | |
|---|---|---|---|
| 2,024,322 | 12/1935 | Wittig | 351/158 |
| 2,389,428 | 11/1945 | Glasser | 351/158 |
| 3,273,456 | 9/1966 | Feinbloom | 351/158 |
| 4,074,368 | 2/1978 | Levy, Jr. et al. | 623/6 |
| 4,155,626 | 5/1979 | Grech | 351/41 |
| 4,429,959 | 2/1984 | Walters | 351/158 |
| 4,624,243 | 11/1986 | Lowery et al. | 128/6 |
| 4,637,696 | 1/1987 | Wilkins | 351/158 |
| 4,666,446 | 5/1987 | Koziol et al. | 623/6 |
| 4,710,197 | 12/1987 | Donn et al. | 623/6 |
| 4,844,071 | 7/1989 | Chen et al. | 128/6 |
| 4,863,468 | 9/1989 | Feinbloom et al. | 623/6 |
| 4,957,506 | 9/1990 | Mercier | 623/6 |
| 5,030,231 | 7/1991 | Portney | 351/158 |
| 5,088,809 | 2/1992 | Portney | 351/158 |

FOREIGN PATENT DOCUMENTS

| | | |
|---|---|---|
| 58495 | 11/1953 | France . |
| 63-321 | 1/1988 | Japan . |
| WO87/04264 | 7/1987 | PCT Int'l Appl. . |
| 400610 | 4/1966 | Switzerland . |

OTHER PUBLICATIONS

"Use of Low-Magnification Telescopes as Optometers in Low Vision", George Woo, O.D., Ph.D., *Optometric Monthly*, pp. 147-151, May 1978.

*Primary Examiner*—Scott J. Sugarman
*Attorney, Agent, or Firm*—Gordon L. Peterson

[57] ABSTRACT

A spectacle system for individuals having impaired vision having at least one ocular implant lens is provided which includes an objective lens for forming a magnified image of a distant object on the individual's retina and a spectacle frame for suporting the objective lens on an individual's head in a spaced apart relationship with the implanted intraocular lens. An actuator and driver are provided to enable manually controlled non-rotational and translational movement of the objective lens along an optical axis defined by the objective lens and the implanted intraocular lens.

20 Claims, 2 Drawing Sheets

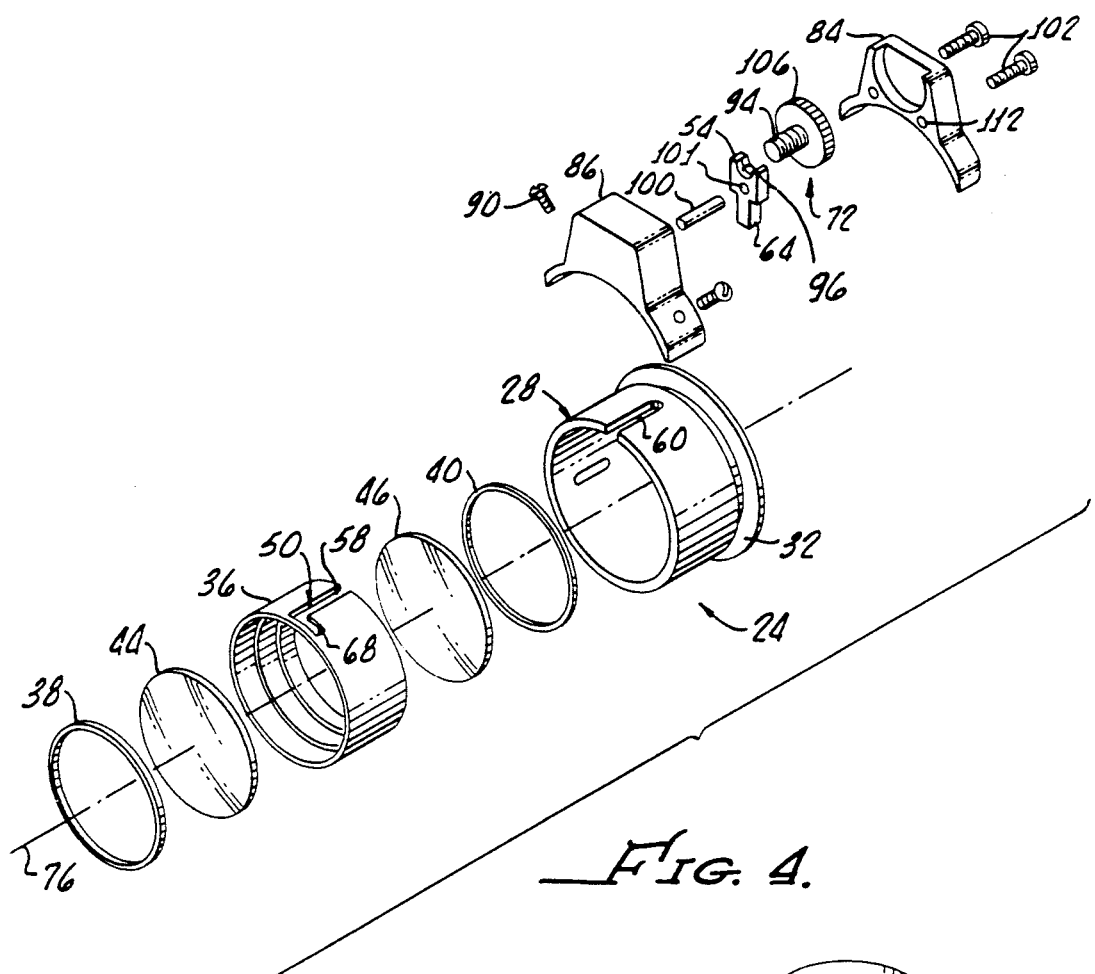
FIG. 4.
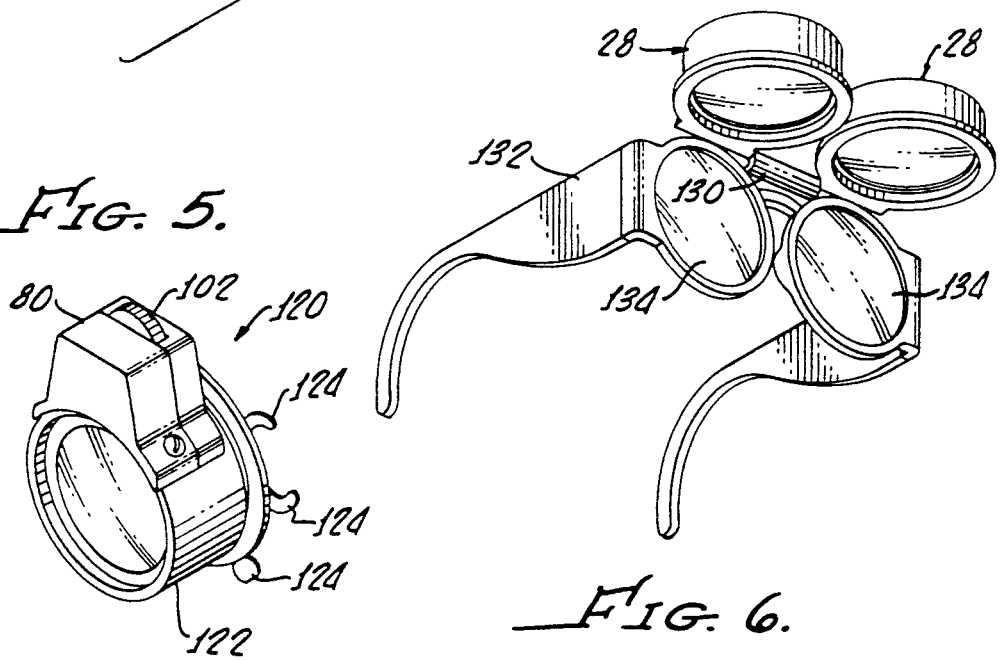
FIG. 5.
FIG. 6.

TELEDIOPTRIC SYSTEM

The present invention generally relates to telescopic, or magnifying, spectacles and more particularly is directed to an adjustable magnifying spectacle for use by individuals having an ocular implant in which at least a portion of the ocular implant serves as the ocular lens of a telescopic system lenses. Such intraocular lens, or ocular implants, are typically used for individuals suffering from macular degeneration.

While implantation of intraocular lenses has become commonplace, many of these ocular implants are of a single focal length, and it is therefore necessary for the user to utilize spectacles or the like in order to enable the individual to correct his or her vision for a range outside of the fixed-focus implanted ocular implant.

It is well known that in the design of spectacle systems, difficulty is encountered in obtaining proper visual acuity under various different viewing circumstances. Hence the spectacle system must be designed with concern to the many visual aspects that may be required by the individual depending on his or her life style. In addition, the spectacle system should be designed in order to accommodate specific individual characteristics to effect proper vision with respect to a particular ocular implant.

Thus, because of the unique problems surrounding the individual with implanted lenses, proper correction to obtain improved visual acuity of the individual is difficult. In view of the fixed focal length of the implanted intraocular lens, problems are encountered in switching from various viewing situations, such as reading to, for example, the watching of television. In most instances, the design of a single objective lens assembly mounted in a conventional spectacle frame is unable to provide proper improved vision for various viewing situations.

SUMMARY OF THE INVENTION

The present invention generally includes a lens and a spectacle which together form the Galilean telescope system for magnifying images to aid the vision of the impaired individual in order to increase the eye's resolving ability. As may be used hereinafter, this system may be considered a teledioptric system.

Generally, a spectacle, or teledioptric, system, in accordance with the present invention for individuals having at least one implanted intraocular lens, or ocular implant, includes an objective lens means for forming an image of a distant object on a retina of the individual. A spectacle frame is provided for supporting the objective lens means on an individual relationship with the implanted intraocular lens.

Means are provided for causing non-rotational and translational movement of the objective lens along an optic axis defined by the objective lens means and the implanted intraocular lens in order to adjust the vertex distance between the objective lens means and the implanted intraocular lens. The adjustability of the vertex distance is crucial to the clarity of the image. Importantly, the translational movement of the objective lens means maintains any astigmatic correction which is not possible if the lens is rotated as typically occurs in conventional telescopic systems.

More particularly, the spectacle system, in accordance with the present invention, may include a lens blank and a lens holder means for supporting the objective lens means with the lens holder means being slidably mounted within the lens blank and the lens blank being fixedly attached to the spectacle frame means.

In one embodiment of the present invention, the lens blank may be hinge mounted to a spectacle frame for enabling rotation thereof out of the ocular implant line of sight. This feature enables the rapid change of telescopic or magnification correction to enable the user to quickly shift from normal vision use, such as moving about, to a situation requiring higher resolving power, such as reading, watching television and social engagement. In addition, it also enables a rapid change from a viewing position, such as watching television, to another viewing position, such as reading.

In another embodiment of the present invention, means may be provided for removably attaching an objective lens means to the spectacle frame means. This enables the user to utilize a preset lens system having a selected vertex distance to be easily attached to the spectacles when reading is desired or under other specific circumstances.

More particularly, the means for causing non-rotational and translational movement of the objective lens means may include a movable driver disposed in a slot in the lens blank and means defining an L-shaped slot in the lens holder means for accepting the driver upon assembly of the lens holder means in the lens blank, in which the driver is disposed within the L portion of the L-shaped slot. The driver may have a threaded hole therein for engagement with a screw actuator, with the driver and the screw actuator being mounted in a housing attached to the lens blank. In order to provide manual control of the driver position, a coaxial wheel attached to the screw actuator protrudes, in part, from the housing for enabling manual rotation thereof.

For individuals having two implanted intraocular lenses, the spectacle system, according to the present invention, includes two lens systems, one for each eye of the individual, which are independently adjustable for accommodating and adjusting the vertex distance between each lens system and the associated implanted intraocular lens.

A method, in accordance with the present invention, for clarifying visual acuity for individuals having at least one implanted intraocular lens includes the steps of disposing an objective lens system in a spaced apart relationship with the implanted intraocular lens and adjusting the vertex distance between the objective lens system and the implanted intraocular lens without rotation of the objective lens system.

BRIEF DESCRIPTION OF THE DRAWINGS

The advantages and features of the present invention will be better understood by the following description when considered in conjunction with the accompanying drawings in which:

FIG. 4 is an exploded view of the lens system of the present invention;

FIG. 5 is an alternative embodiment of the present invention; and

FIG. 6 is another embodiment of the present invention in which the lens system is hinge-mounted to a spectacle frame to enable rotation thereof out of the line of sight of the individual.

DETAILED DESCRIPTION

Figure 1:
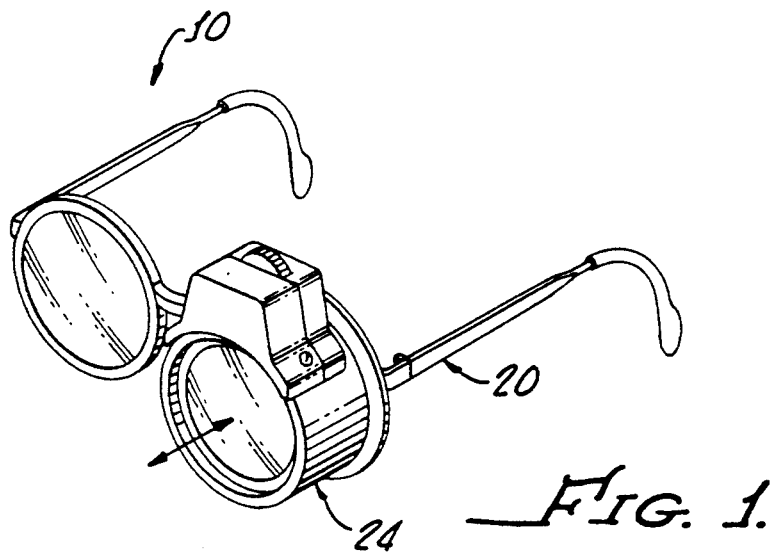
FIG. 1 is a perspective view of the present invention including a lens system attached to a spectacle frame.
Figure 2:
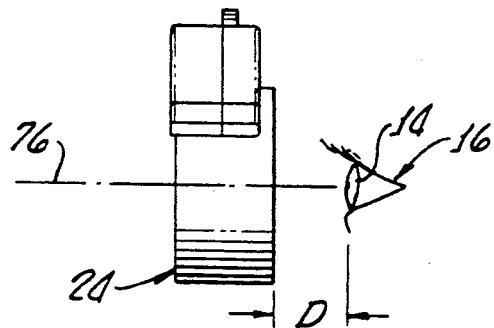
FIG. 2 is a schematic diagram of the operation of the lens system in conjunction with an implanted intraocular lens.

Turning now to FIG. 1, there is shown a spectacle system 10 for individuals (not shown) having at least one intraocular lens 14, as represented in FIG. 2. The lens may be implanted in any conventional manner and may be positioned in an anterior chamber of the individual's eye 16 or a posterior chamber of the individual's eye 16.

Generally, the spectacle, or teledioptric, system 10 includes a spectacle frame 20 which provides means for supporting an objective lens system 24 in a spaced apart relationship with the implanted intraocular lens 14, as shown in FIG. 2.

It should be appreciated that while only one objective lens system 24 is shown in the figures, two identical lens systems 24 may be mounted on the frame 20 in a side-by-side relationship for individuals having two implanted intraocular lenses. In addition, the spectacle system 10 in accordance with the present invention may also be suitable for individuals having impaired vision.

Figure 3:
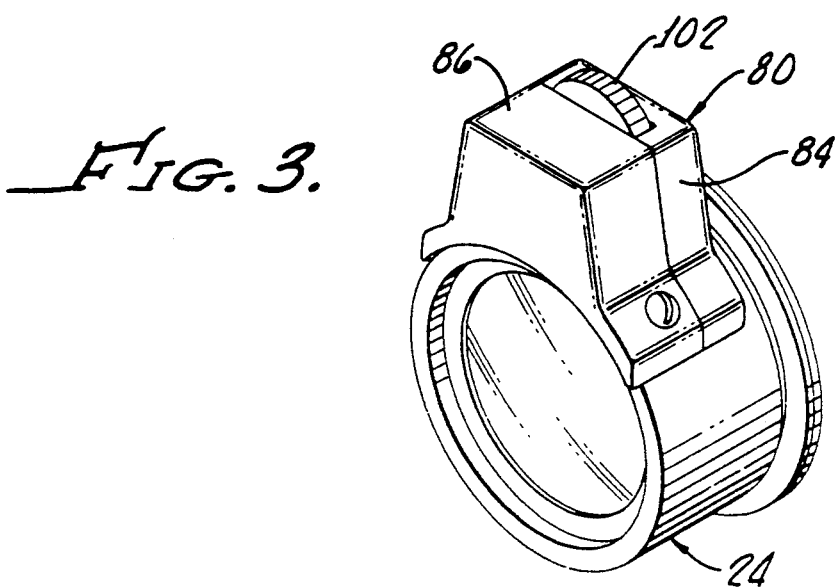
FIG. 3 is an enlarged perspective view of the lens system of the present invention when assembled.

The objective lens system 24 provides a means for forming an image of a distant object on the implanted intraocular lens. As shown in FIGS. 3 and 4, the lens system 24 includes a lens blank or outer body 28 formed from a cylindrical member 30 having a circumference and rear perimeter 32 sized for fitting into the spectacle frame 20 in a conventional manner. A lens holder 36 is provided along with snap rings 38 40 for supporting lens pieces 44 46. While two lens pieces 44 46 are shown, it should be appreciated that any lens system and combination of lenses may be utilized as may be prescribed for increasing the visual acuity of the individual user including astigmatic correction.

As shown, the lens holder 36 is sized for being slidably mounted in the lens blank 28 and includes an L-shaped slot 50 for enabling engagment with a driver 54 as will be described hereinafter in greater detail.

Upon assembly, a long portion 58 of the slot 50 and a slot 60 in the lens blank 28 enable a depending portion or segment 64 of the driver 54 to align the lens holder 36 with the lens blank 28. After insertion of the lens holder 50 into the lens blank 28, rotation of the lens holder 50 in a counter-clockwise manner enables the driver 54 to engage an L portion 68 of the slot 50.

The driver 54, along with an actuator 72, provides a means for causing non-rotational and translational movement of the lens holder 36 along an optical axis 76, as represented by an arrow 78, in order to adjust the vertex distance D, see FIG. 2, between the objective lens system 24 and the implanted intraocular lens 14.

The driver 54 and actuator 72 are supported by a housing 80 which includes a rear portion 84 and a front portion 86, the latter being attached to the lens blank 28 by screws 90.

The actuator 72 includes a threaded portion 94 for engagement with a threaded hole 96 in the driver 54. As shown in FIGS. 3 and 4, a dowel 100 extends through a hole 101 in the driver 64 when the housing rear 84 and front 86 portions are attached by screws 102 with the actuator 72 and the driver 54 therebetween. Upon assembly, a knurled wheel 106 of the actuator 72 protrudes from the housing 80, as shown in FIG. 3, enabling manual rotation thereof in order to move the driver and lens holder in a translational manner.

An alternative spectacle system 120, in accordance with the present invention, includes a lens blank 122 having clips 124 thereon for attachment to a conventional pair of glasses, not shown.

Another embodiment 126 of the present invention is shown in FIG. 6 in which hinges mounting the lens blanks 28 to a frame 132 provide a means for enabling the lens blanks 28 to be rotated out of the intraocular lens line of sight. This is particularly useful for providing the user with a quick adjustment from distant to close viewing.

The spectacle system, or teledioptric 10, in accordance with the present invention, is particularly useful for providing enhanced visual acuity at various focal lengths. For example, the user may adjust the lens holder 36 by way of the wheel 106 to provide clear television viewing and alternatively, when reading, further adjustment of the lens holder 122 provides comfortable reading vision.

Although there has been hereinabove described teledioptric system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A spectacle system comprising:
    a spectacle frame;
    a lens;
    a mounting structure carried by the spectacle frame for mounting the lens on the spectacle frame for non-rotational and translational movement relative to the spectacle frame along an optical axis;
    the spectacle frame being constructed to support said lens on an individual's head in a spaced apart relationship with the individual's eye with the lens being the most posterior refracting element of the spectacle system; and
    a driving mechanism including a movable actuator for imparting said non-rotational and translational movement of the lens relative to the spectacle frame along the optical axis in order to adjust the distance between the lens and the individual's eye.

2. A spectacle system comprising:
    a spectacle frame;
    first and second lenses;
    first and second mounting structures carried by the spectacle frame for mounting the first and second lenses, respectively, on the spectacle frame for non-rotational and translational movement relative to the spectacle frame along separate optical axes;
    the spectacle frame being constructed to support said lenses on an individual's head in a spaced apart relationship with the individual's eyes, respectively; and
    first and second driving mechanisms associated with the first and second mounting structures, respectively, each of said driving mechanisms including a rotatable actuator having a threaded portion, each of said actuators being rotatable to rotate the threaded portion of the actuator to impart said non-rotational and translational movement to the associated lens relative to the spectacle frame along the associated optical axis in order to adjust the distance between such lens and the individual's eye whereby each of said first and second lenses can be separately adjusted.

3. A spectacle system as defined in claim 2 wherein the first driving mechanism includes a driver having a treaded portion which is driven by rotation of the threaded portion of the actuator of the first driving mechanism to impart said non-rotational and translational movement to the first lens.

4. A spectacle system as defined in claim 3 wherein the threaded portion of the actuator of the first driving mechanism includes a screw and the threaded portion of the driver includes a hole in the driver receiving the screw.

5. A spectacle system as defined in claim 3 wherein the first mounting structure has a slot and the driver has a segment received in the slot.

6. A spectacle system as defined in claim 3 wherein the first mounting structure includes a lens holder for supporting the first lens and an outer body which slidably receives the lens holder, said driver has a segment and said outer body has a slot which receives said segment of the driver and said segment of the driver is drivingly coupled to the lens holder.

7. A spectacle system as defined in claim 6 including a housing mounted on the outer body, said threaded portions of the actuator and the driver of the first driving mechanism being received in the housing.

8. A spectacle system as defined in claim 7 wherein the actuator of the first driving mechanism includes a wheel which protrudes from the housing to enable manual rotation of the actuator of the first driving mechanism to impart non-rotational and translational movement to the driver and the lens holder.

9. A spectacle system as defined in claim 2 wherein the first driving mechanism includes a driver having a threaded portion which is driven by rotation of the threaded portion of the actuator of the first driving mechanism to impart said non-rotational and translational movement to the first lens, the spectacle system includes a housing mounted on the first mounting structure, said threaded portions of the actuator and the driver of the first driving mechanism being received in the housing.

10. A spectacle system as defined in claim 2 wherein said first lens is the most posterior refracting element of the spectacle system which lies along the optical axis of the first lens.

11. A spectacle system as defined in claim 2 including first and second housings carried by the first and second mounting structures, respectively, the actuators of the first and second driving mechanisms being partially received in the first and second housings, respectively, and projecting from the associated housing to enable separate manual rotation of the actuators.

12. A spectacle system comprising:
a spectacle frame;
at least one lens;
a mounting structure carried by the spectacle frame for mounting the lens on the spectacle frame for non-rotational and translational movement relative to the spectacle frame along an optical axis, said mounting structure including a lens holder for supporting the lens and an outer body which slidably receives the lens holder;

the spectacle frame being constructed to support said lens on an individual's head in a spaced apart relationship with the individual's eye; and a driving mechanism including a rotatable actuator having a threaded portion and a driver having a threaded portion, said driver having a segment and said outer body having a slot which receives said segment of the driver and said segment of the driver is drivingly coupled to the lens holder, said actuator being rotatable and cooperable with the threaded portion of the driver to impart said non-rotational and translational movement to the lens relative to the spectacle frame along the optical axis in order to adjust the distance between the lens and the individual's eye.

13. A spectacle system as defined in claim 12 wherein the threaded portion of the actuator includes a screw and the threaded portion of the driver includes a hole in the driver receiving the screw.

14. A spectacle system as defined in claim 12 including a housing mounted on the outer body, said threaded portions of the actuator and the driver being received in the housing.

15. A spectacle system as defined in claim 14 wherein the actuator includes a wheel which protrudes from the housing to enable manual rotation of the actuator to impart non-rotational and translational movement to the driver and the lens holder.

16. A spectacle system as defined in claim 12 wherein the lens holder has a generally L-shaped slot in registry with the slot in the outer body and said segment of said driver is received in said L-shaped slot.

17. A spectacle system comprising:
first and second intraocular lenses;
a spectacle frame;
first and second objective lenses;
first and second mounting structures carried by the spectacle frame for mounting the first and second objective lenses, respectively, on the spectacle frame for non-rotational and translational movement relative to the spectacle frame along separate optical axes;

the spectacle frame being constructed to support said first and second objective lenses on an individual's head in a spaced apart relationship with the first and second intraocular lenses, respectively; and first and second driving mechanisms associated with the first and second mounting structures, respectively, each of said driving mechanisms including a rotatable actuator having a threaded portion, said actuator being rotatable to rotate the threaded portion of the actuator to impart said non-rotational and translational movement to the associated objective lens relative to the spectacle frame along the associated optical axis in order to adjust the distance between such objective lens and the intraocular lens.

18. A spectacle system as defined in claim 17 wherein the first driving mechanism includes a driver having a threaded portion which is driven by rotation of the threaded portion of the actuator of the first driving mechanism to impart sad non-rotational and translational movement to the first objective lens, the spectacle system includes a housing mounted on the first mounting structure, said threaded portions of the actuator of the first driving mechanism and the driver being received in the housing.

19. A spectacle system as defined in claim 17 wherein the first driving mechanism includes a driver having a threaded portion which is driven by rotation of the threaded portion of the actuator of the first driving mechanism to impart said non-rotational and translational movement to the lens.

20. A spectacle system as defined in claim 17 wherein the first mounting structure includes an outer body carrying the lens and a hinge for attaching the outer body to the spectacle frame for pivotal movement relative to the spectacle frame to enable the first objective lens to be pivoted out of a line of sight of the first intraocular lens.

* * * * *